United States Patent
Roffe

(10) Patent No.: US 12,460,671 B2
(45) Date of Patent: Nov. 4, 2025

(54) BEARING ASSEMBLY

(71) Applicant: Schaeffler Technologies AG & Co. KG, Herzogenaurach (DE)

(72) Inventor: Dennis Roffe, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 100 days.

(21) Appl. No.: 18/474,837

(22) Filed: Sep. 26, 2023

(65) Prior Publication Data

US 2025/0102016 A1 Mar. 27, 2025

(51) Int. Cl.
 *F16C 25/08* (2006.01)
 *F16C 27/04* (2006.01)
 *F16C 35/067* (2006.01)

(52) U.S. Cl.
 CPC ............ *F16C 25/083* (2013.01); *F16C 27/04* (2013.01); *F16C 35/067* (2013.01)

(58) Field of Classification Search
 CPC ........ F16C 25/08; F16C 25/083; F16C 27/04; F16C 27/06; F16C 27/066
 See application file for complete search history.

(56) References Cited

U.S. PATENT DOCUMENTS

| | | | |
|---|---|---|---|
| 3,934,957 A | 1/1976 | Derner | |
| 5,719,454 A * | 2/1998 | Halsey | F16C 25/083 310/90 |
| 7,800,265 B2 * | 9/2010 | Nishikawa | F16C 25/083 310/90 |
| 7,839,039 B2 * | 11/2010 | Matsubara | F16C 25/083 310/90 |
| 8,851,227 B2 * | 10/2014 | Houdayer | F16C 25/083 384/535 |
| 2022/0341467 A1 * | 10/2022 | Zhong | F16C 25/083 |

FOREIGN PATENT DOCUMENTS

WO WO-8300729 A1 * 3/1983

* cited by examiner

*Primary Examiner* — James Pilkington
(74) *Attorney, Agent, or Firm* — Price Heneveld LLP

(57) ABSTRACT

A bearing assembly includes a housing having an annular interior portion and a bearing cartridge disposed radially inboard of the annular interior portion. The bearing cartridge includes a bearing that includes an inner ring, an outer ring, and a plurality of rolling elements disposed radially between the inner and outer rings, a washer engaged with the bearing and having a retention tab, and a spring that is retained in engagement with the washer via the retention tab. The spring biases the washer and the bearing relative to the housing in a first axial direction.

19 Claims, 5 Drawing Sheets

BEARING ASSEMBLY

FIELD OF THE DISCLOSURE

The present disclosure generally relates to a bearing assembly. More specifically, the present disclosure relates to a bearing assembly that includes a bearing cartridge.

BACKGROUND OF THE DISCLOSURE

Bearing assemblies often include housings and bearings that are configured to be assembled with the housings. In operation of some bearing assemblies, bearings are configured to float or move axially within their corresponding housings.

SUMMARY OF THE DISCLOSURE

According to a first aspect of the present disclosure, a bearing assembly includes a housing having an annular interior portion and a bearing cartridge disposed radially inboard of the annular interior portion. The bearing cartridge includes a bearing that includes an inner ring, an outer ring, and a plurality of rolling elements disposed radially between the inner and outer rings, a washer engaged with the bearing and having a retention tab, and a spring that is retained in engagement with the washer via the retention tab. The spring biases the washer and the bearing relative to the housing in a first axial direction.

Embodiments of the first aspect of the disclosure can include any one or a combination of the following features:
- the housing includes a shoulder that extends from the annular interior portion of the housing, and the spring is configured to contact the shoulder and the washer to bias the washer and the bearing axially away from the shoulder;
- a retaining ring disposed within a channel defined by the housing, wherein the spring is configured to contact the retaining ring and the washer to bias the washer and the bearing axially away from the retaining ring;
- the washer is engaged with the bearing, such that axial movement of the washer relative to the bearing is restricted, and the spring is retained in engagement with the washer via the retention tab, such that axial displacement of the spring relative to the washer in a second axial direction that is opposite the first axial direction is limited by the retention tab;
- the spring is a disc spring that includes an annular interior surface and an annular exterior surface that is positioned radially outboard of the annular interior surface;
- the annular interior surface is positioned axially nearer than the annular exterior surface to the outer ring of the bearing;
- the annular interior surface is positioned axially between the outer ring of the bearing and the retention tab of the washer, and at least a portion of the annular interior surface is positioned radially inboard of at least a portion of the retention tab of the washer; and
- the washer is a first washer and the spring is a first spring, and the bearing cartridge further comprises a second washer engaged with the bearing and having a retention tab, and a second spring that is retained in engagement with the second washer via the retention tab of the second washer, wherein the second spring biases the second washer and the bearing relative to the housing in a second axial direction that is opposite the first axial direction.

According to a second aspect of the present disclosure, a bearing cartridge for insertion into a housing of a bearing assembly includes a bearing that includes an inner ring, an outer ring, and a plurality of rolling elements disposed radially between the inner and outer rings, a washer engaged with the bearing, and a spring that is engaged with the washer such that axial displacement of the spring relative to the bearing is limited by the washer. The spring is configured to bias the washer and the bearing relative to said housing in a first axial direction.

Embodiments of the second aspect of the disclosure can include any one or a combination of the following features:
- the washer comprises a retention tab that is configured to retain the spring in engagement with the washer and limit axial displacement of the spring away from the plurality of rolling elements;
- the washer is engaged with the outer ring of the bearing via contact between the washer and a radially outboard side of the outer ring that is opposite a radially inboard side of the outer ring with which the plurality of rolling elements contact;
- the spring is a disc spring that includes an annular interior surface and an annular exterior surface that is positioned radially outboard of the annular interior surface;
- the annular interior surface is positioned axially between the outer ring of the bearing and the retention tab of the washer, and at least a portion of the annular interior surface is positioned radially inboard of at least a portion of the retention tab of the washer; and
- the washer is a first washer and the spring is a first spring, and the bearing cartridge further comprises a second washer engaged with the bearing such that axial movement of the second washer relative to the bearing is restricted, and a second spring that that is engaged with the second washer such that axial displacement of the second spring relative to the bearing is limited by the second washer, wherein the second spring is configured to bias the second washer and the bearing relative to said housing in a second axial direction that is opposite the first axial direction.

According to a third aspect of the present disclosure, a bearing assembly includes a housing having an annular interior portion and a bearing cartridge disposed radially inboard of the annular interior portion. The bearing cartridge includes a bearing that includes an inner ring, an outer ring, and a plurality of rolling elements disposed radially between the inner and outer rings, a first washer engaged with the bearing, a first spring that is engaged with the first washer such that axial displacement of the first spring relative to the bearing is limited by the first washer, a second washer engaged with the bearing, and a second spring that is engaged with the second washer such that axial displacement of the second spring relative to the bearing is limited by the second washer. The first spring biases the first washer and the bearing relative to the housing in a first axial direction. The second spring biases the second washer and the bearing relative to the housing in a second axial direction that is opposite the first axial direction.

Embodiments of the third aspect of the disclosure can include any one or a combination of the following features:
- the bearing cartridge is operable between a first axial position within the housing, wherein the elastic potential energy of the first spring is a first amount and the elastic potential energy of the second spring is a second amount, and a second axial position within the housing, wherein the elastic potential energy of the first spring is a third amount and the elastic potential energy of the second spring is a fourth amount, and wherein the first amount is greater than the third amount and the second amount is less than the fourth amount;

the first amount and the second amount are substantially equal;

a retaining ring disposed within a channel defined by the housing, wherein the first spring is configured to contact the retaining ring and the first washer to bias the first washer and the bearing axially away from the retaining ring;

the housing includes a shoulder that extends from the annular interior portion of the housing, and the second spring is configured to contact the shoulder and the second washer to bias the second washer and the bearing axially away from the shoulder; and the first and second springs are disc springs.

These and other features, advantages, and objects of the present disclosure will be further understood and appreciated by those skilled in the art by reference to the following specification, claims, and appended drawings.

Figure 1:
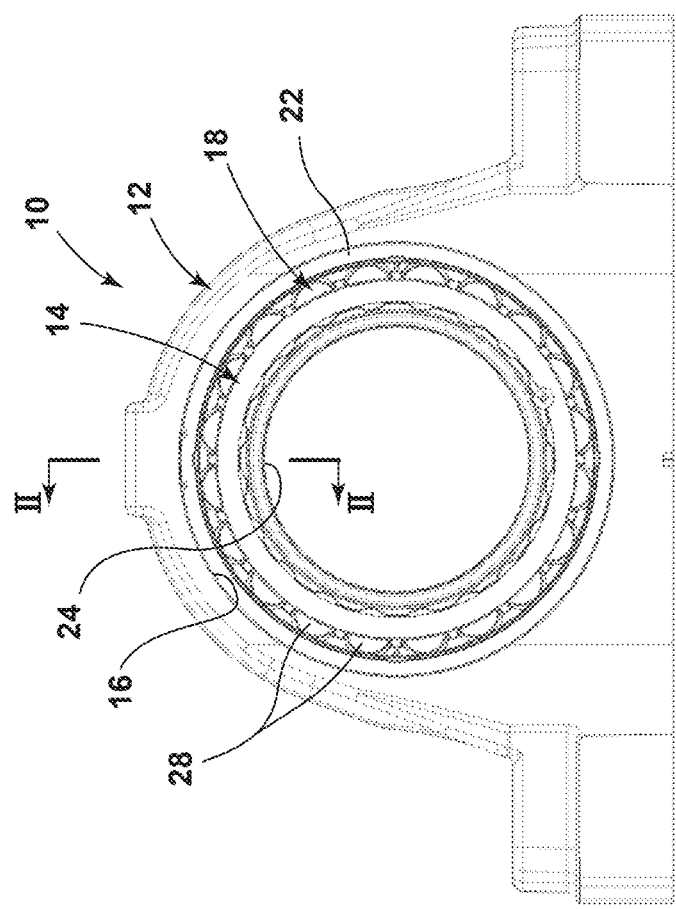
FIG. 1 is an elevational view of a bearing assembly illustrating a housing and a bearing cartridge disposed within the housing.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis.

Referring now to FIGS. 1-6, a bearing assembly 10 includes a housing 12 and a bearing cartridge 14. The housing 12 includes an annular interior portion 16. The bearing cartridge 14 is disposed radially inboard of the annular interior portion 16. The bearing cartridge 14 includes a bearing 18, a washer 20, and a spring 22. The bearing 18 includes an inner ring 24, an outer ring 26, a plurality of rolling elements 28 disposed radially between the inner and outer rings 24, 26, and a cage 38 to retain and guide the plurality of rolling elements 28. The washer 20 is engaged with the bearing 18 and includes a retention tab 30. The spring 22 is retained in engagement with the washer 20 via the retention tab 30. The spring 22 biases the washer 20 and the bearing 18 relative to the housing 12 in a first axial direction.

Figure 3:
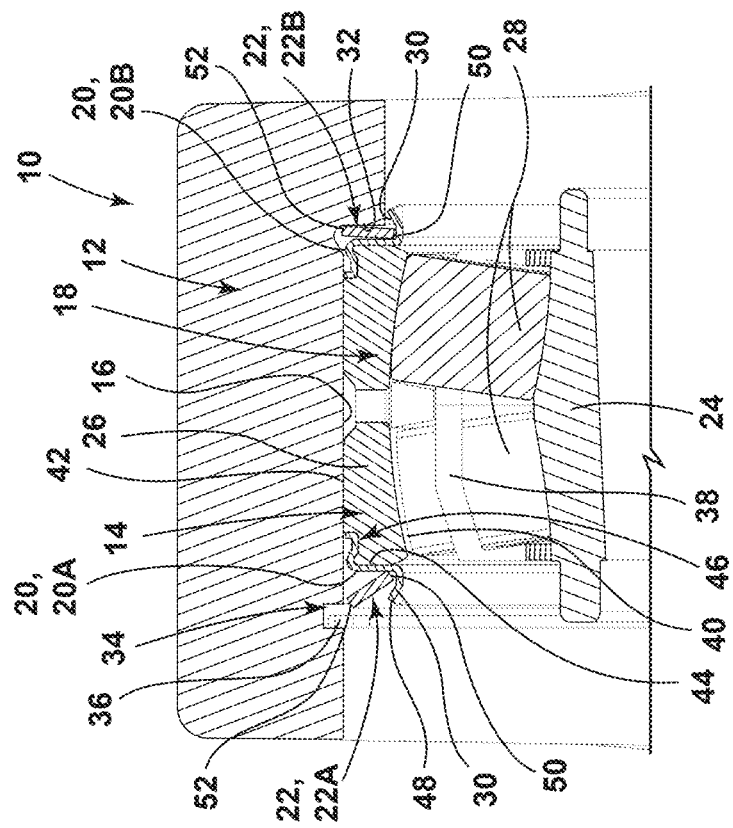
FIG. 3 is a cross-sectional view of a bearing assembly illustrating a housing and a bearing cartridge in a second position within the housing.
Figure 2:
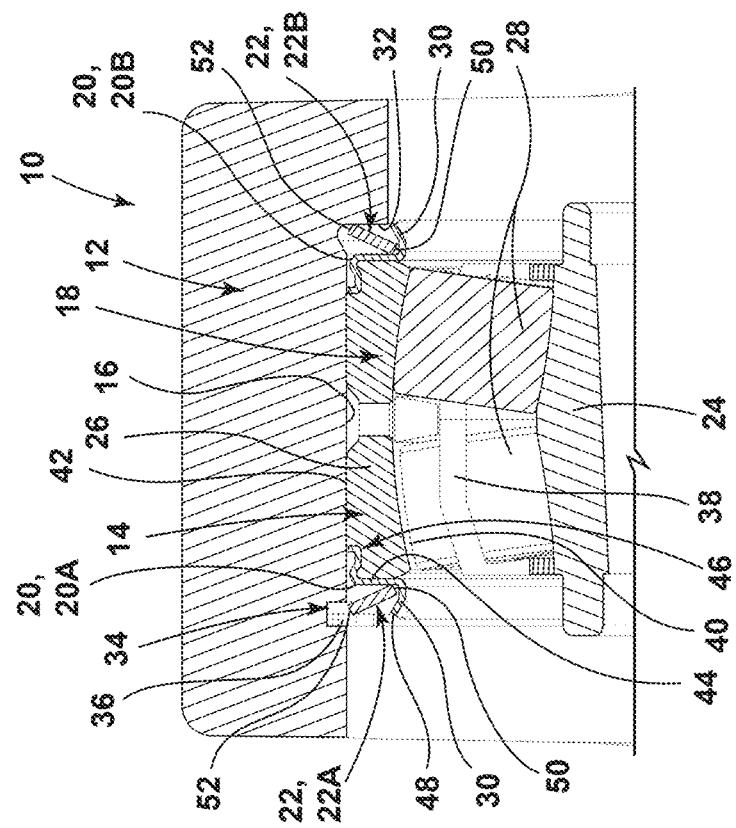
FIG. 2 is a cross-sectional view of the bearing assembly of FIG. 1 taken at line II-II illustrating the housing of the bearing cartridge in a first position within the housing.
Figure 4:
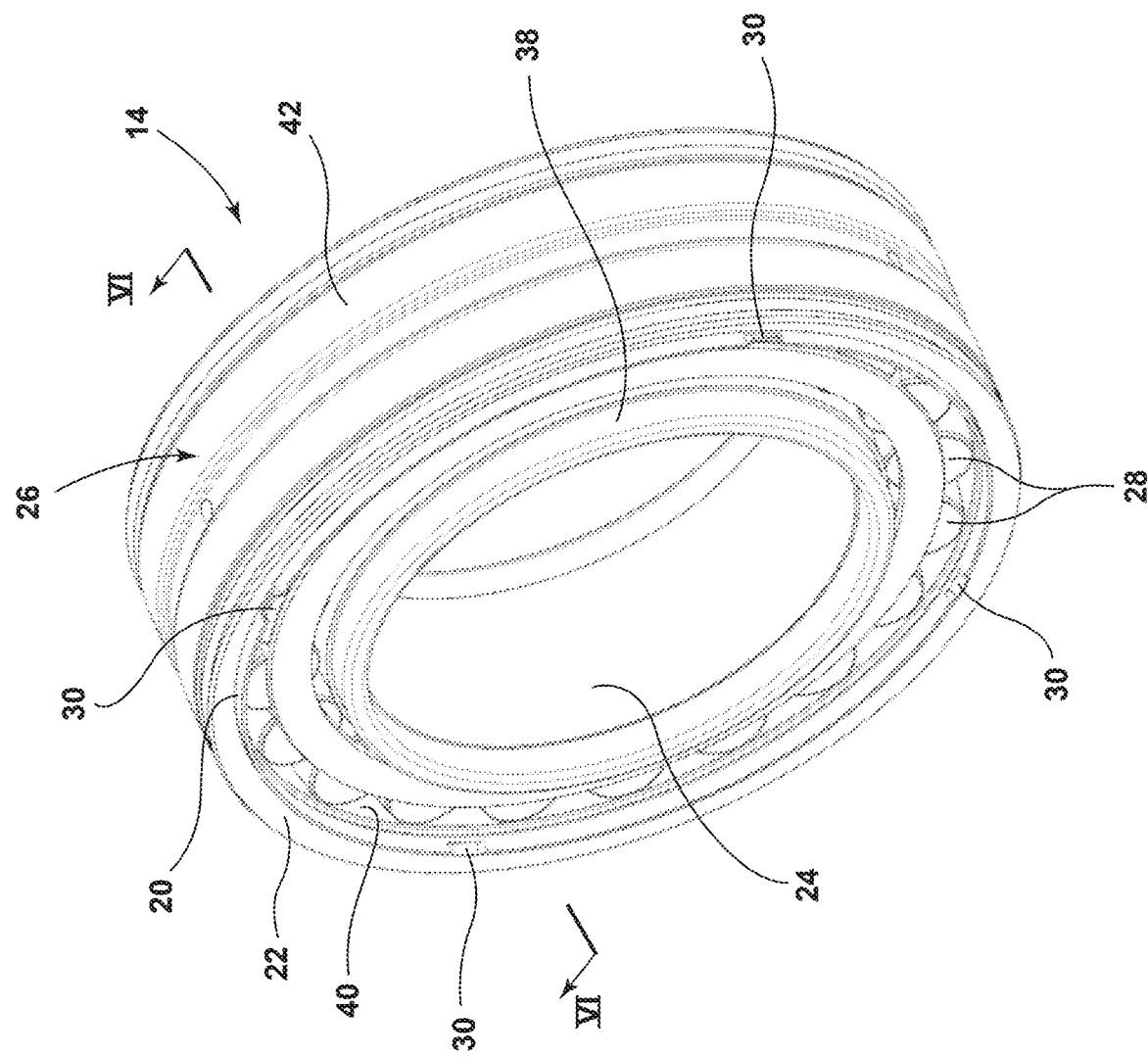
FIG. 4 is a top perspective view of a bearing cartridge that includes a bearing, a washer with a plurality of retention tabs, and a spring that is retained by the retention tabs of the washer.

Referring now to FIGS. 1-3, the bearing assembly 10 includes the housing 12. The housing 12 includes the annular interior portion 16. As illustrated in FIGS. 2 and 3, the housing 12 may include a shoulder 32 that extends from the annular interior portion 16 of the housing 12. It is contemplated that the housing 12 may include a plurality of shoulders 32, in some implementations. For example, a split type housing 12 may include two opposing shoulders 32. In some implementations, the annular interior portion 16 of the housing 12 defines a channel 34. For example, as illustrated in FIGS. 2 and 3, the annular interior portion 16 of the housing 12 defines the channel 34. In the illustrated embodiment, a retaining ring 36 is received within the channel 34 defined by the housing 12.

Referring now to FIGS. 1-6, the bearing assembly 10 includes the bearing cartridge 14. The bearing cartridge 14 is configured to be inserted into the housing 12 of the bearing assembly 10. As illustrated in FIGS. 2 and 3, the bearing cartridge 14 is disposed radially inboard of the annular interior portion 16 of the housing 12.

The bearing cartridge 14 includes the bearing 18. As discussed further herein, the bearing 18 is operable to move (i.e., float) along the annular interior portion 16 of the housing 12. As illustrated in FIG. 2, the bearing 18 includes the inner ring 24, the outer ring 26, the cage 38 disposed radially between the inner and outer rings 24, 26, and the plurality of rolling elements 28 retained by the cage 38. The outer ring 26 is positioned radially outboard of the inner ring 24 and includes a radially inboard side 40 that the plurality of rolling elements 28 contact and a radially outboard side 42 opposite the radially inboard side 40. A side face 44 of the outer ring 26 extends between the radially inboard and outboard sides 40, 42 of the outer ring 26. A shaft (not shown) is configured to be received within the inner ring 24. A variety of types of rolling elements 28 are contemplated (e.g., balls, rollers, needles, etc.). Further, the bearing 18 can be a variety of types of bearings 18 (e.g., spherical bearing, ball bearing, roller bearing, etc.).

Referring now to FIGS. 2-6, the bearing cartridge 14 includes the washer 20. In various embodiments, the bearing cartridge 14 includes a plurality of washers 20. For example, in the embodiment illustrated in FIGS. 2, 3, and 6, the bearing cartridge 14 includes a first washer 20A and a second washer 20B, as described further herein. The washer 20 of the bearing cartridge 14 is engaged with the bearing 18. In various implementations, the washer 20 is engaged with the bearing 18, such that axial movement of the washer 20 relative to the bearing 18 is restricted. In some implementations, the washer 20 is engaged with the outer ring 26 of the bearing 18 via contact between the washer 20 and the radially outboard side 42 of the outer ring 26.

Figure 6:
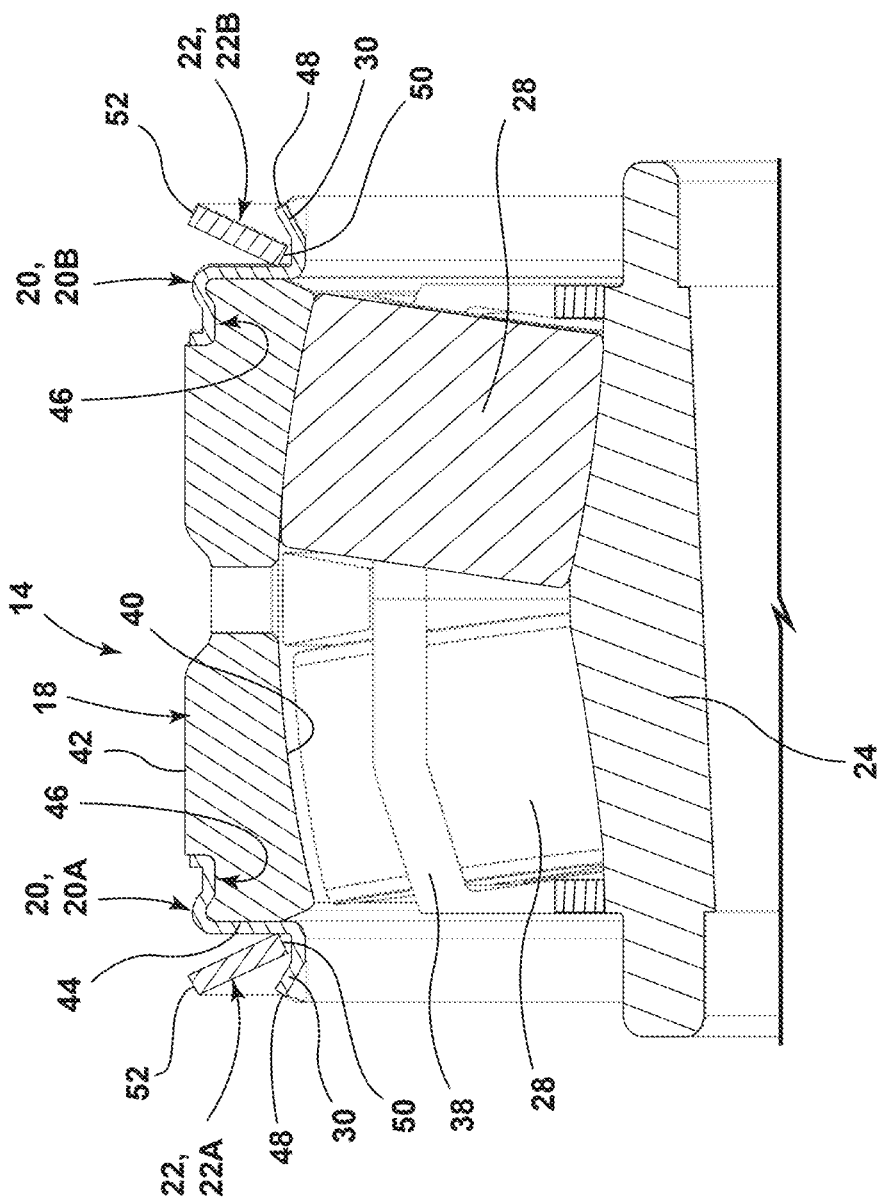
FIG. 6 is a cross-sectional view of the bearing cartridge of FIG. 4 at line VI-VI, illustrating the bearing, first and second washers, and first and second springs.

In the embodiment illustrated in FIG. 6, the radially outboard side 42 of the outer ring 26 defines a recess 46, such as an annular groove or channel that extends circumferentially about the radially outboard side 42 of the outer ring 26. The washer 20 is shaped to be received within the recess 46, such that axial movement of the washer 20 relative to the outer ring 26 is limited due to contact between the portion of the washer 20 received within the recess 46 and the outer ring 26. As illustrated in FIG. 6, the washer 20 extends radially inboard along the side face 44 of the outer ring 26 before extending axially outward away from the outer ring 26. In the illustrated embodiment, a retention tab 30 extends axially outward and radially outboard to a terminal edge 48 of the washer 20, as described further herein.

Referring now to FIGS. 2-6, the washer 20 includes the retention tab 30. In various implementations, the washer 20 includes a plurality of retention tabs 30. In the embodiment illustrated in FIG. 6, the retention tab 30 extends axially outward and radially outboard to a terminal edge 48 of the washer 20. A variety of types and orientations of retention tabs 30 are contemplated. As described further herein, the retention tab 30 is configured to retain the spring 22 of the bearing cartridge 14 in engagement with the washer 20 and limit axial displacement of the spring 22 relative to the bearing 18 and/or one or more components of the bearing 18, such as the plurality of rolling elements 28.

Figure 5:
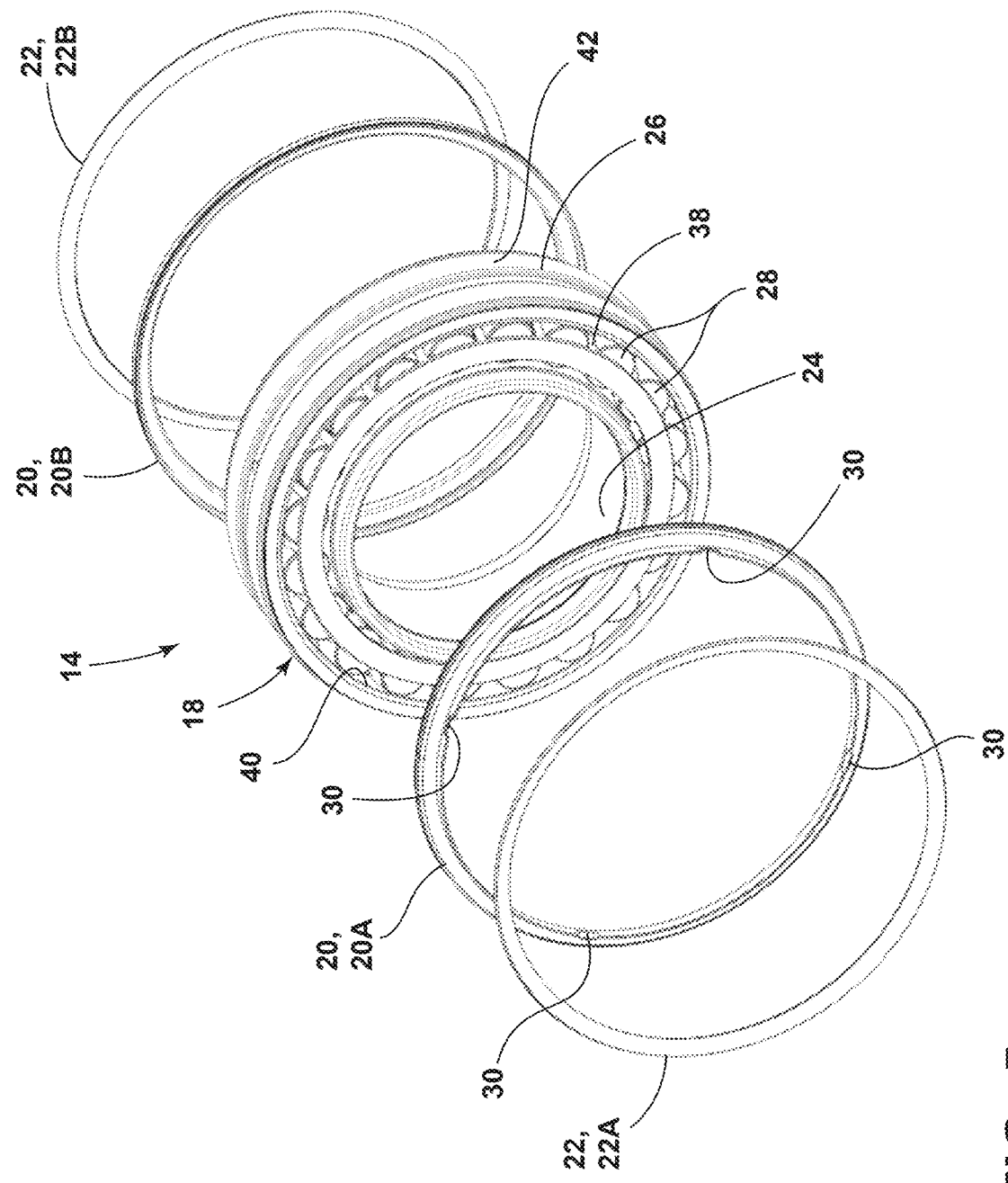
FIG. 5 is an exploded view of a bearing cartridge illustrating a bearing, first and second washers, and first and second springs.

Referring still to FIGS. 2-6, the bearing cartridge 14 includes the spring 22. In various implementations, the bearing cartridge 14 may include a plurality of springs 22. For example, as illustrated in FIGS. 2, 3, 5, and 6, the bearing cartridge 14 includes a first spring 22A and a second spring 22B. The spring 22 of the bearing cartridge 14 is configured to be engaged with the washer 20 such that axial displacement of the spring 22 relative to the bearing 18 is limited by the washer 20. As illustrated in FIG. 6, the retention tab 30 of the washer 20 is configured to retain the spring 22 in engagement with the washer 20 and limit axial displacement of the spring 22 away from the plurality of rolling elements 28. In some implementations, the spring 22 is a disc spring, as illustrated in FIG. 5. In the embodiment illustrated in FIG. 6, the spring 22 is a disc spring that includes an annular interior surface 50 and an annular exterior surface 52 that is positioned radially outboard of the annular interior surface 50. The annular interior surface 50 is positioned axially nearer than the annular exterior surface 52 to the outer ring 26 of the bearing 18, in the embodiment illustrated in FIG. 6. As further illustrated in FIG. 6, the annular interior surface 50 may be positioned axially between the outer ring 26 of the bearing 18 and the retention tab 30 of the washer 20, and at least a portion of the annular interior surface 50 may be positioned radially inboard of at least a portion of the retention tab 30 of the washer 20.

Referring still to FIGS. 2-6, the spring 22 is configured to bias the washer 20 and/or the bearing 18 relative to the housing 12 in an axial direction of the bearing assembly 10. As illustrated in FIG. 2, in some implementations, the spring 22 is configured to contact the shoulder 32 of the housing 12 and the washer 20 to bias the washer 20 and the bearing 18 axially away from the shoulder 32 of the housing 12. As further illustrated in FIG. 2, the spring 22 may be configured to contact the retaining ring 36 of the bearing assembly 10 and the washer 20 to bias the washer 20 and the bearing 18 axially away from the retaining ring 36. In various implementations, the spring 22 is configured to bias the bearing 18 and the washer 20 in a first axial direction, and the retention tab 30 of the washer 20 is configured to limit axial displacement of the spring 22 relative to the washer 20 in a second axial direction that is opposite the first axial direction.

Referring now to FIGS. 2-5, in some embodiments, the bearing cartridge 14 includes first and second washers 20A, 20B and first and second springs 22A, 22B. As illustrated in FIGS. 2 and 3, the first and second springs 22A, 22B and the first and second washers 20A, 20B are positioned on opposite axial sides of the bearing 18. In various implementations, the first spring 22A is configured to bias the first washer 20A and/or the bearing 18 in a first axial direction relative to the housing 12, and the second spring 22B is configured to bias the second washer 20B and/or the bearing 18 in a second axial direction that is opposite the first axial direction relative to the housing 12 of the bearing assembly 10. Further, the retention tab 30 of the first washer 20A is configured to limit axial displacement of the first spring 22A relative to the bearing 18 in the second axial direction, and the retention tab 30 of the second washer 20B is configured to limit axial displacement of the second spring 22B relative to the bearing 18 in the first axial direction.

Referring now to FIGS. 2 and 3, in various embodiments, the bearing cartridge 14 is operable between a first axial position within the housing 12, as illustrated in FIG. 2, and a second axial position within the housing 12, as illustrated in FIG. 3. In the first axial position of the bearing cartridge 14, the elastic potential energy of the first spring 22A is a first amount and the elastic potential energy of the second spring 22B is a second amount. In the second axial position of the bearing cartridge 14 within the housing 12, the elastic potential energy of the first spring 22A is a third amount, and the elastic potential energy of the second spring 22B is a fourth amount. The first amount is greater than the third amount and the second amount is less than the fourth amount. In some implementations, the first amount and the second amount are substantially equal to each other.

In an exemplary embodiment of the bearing assembly 10, illustrated in FIGS. 2 and 3, the bearing cartridge 14 includes the bearing 18, the first washer 20A, the second washer 20B, the first spring 22A, and the second spring 22B. The housing 12 of the bearing assembly 10 includes the shoulder 32, and the retaining ring 36 is received within the channel 34 defined by the housing 12.

In operation of the exemplary embodiment illustrated in FIGS. 2 and 3, initially, the bearing cartridge 14 is in the first axial position, as illustrated in FIG. 2. In the first axial position, the first spring 22A is in contact with the retaining ring 36 and the first washer 20A and biases the bearing 18 in a first axial direction that is toward the second spring 22B. Further, the second spring 22B is in contact with the shoulder 32 of the housing 12 and the second washer 20B and is biasing the bearing 18 in a second axial direction that is opposite the first axial direction. As such, the bearing 18 is held generally at equilibrium due to the opposing biasing forces applied to the bearing 18 via the first and second springs 22A, 22B. Next, due to forces applied to the bearing 18 during operation of the bearing assembly 10, the bearing 18 floats within the housing 12 in the first axial direction, such that the bearing cartridge 14 enters the second axial position, as illustrated in FIG. 3. As the bearing cartridge 14 moves to the second axial position, the elastic potential energy of the second spring 22B increases as the second spring 22B is compressed between the second washer 20B and the shoulder 32 of the housing 12. Simultaneously, the bearing 18 and second washer 20B move axially away from the retaining ring 36 of the bearing assembly 10, which causes the first spring 22A to rebound toward an at rest condition, such that the elastic energy of the first spring 22A decreases. As illustrated in FIG. 3, the first spring 22A is in a spaced-relationship with the retaining ring 36 while the bearing cartridge 14 is in the second axial position, such that movement of the first spring 22A in the second axial direction is not inhibited by contact between the first spring 22A and the retaining ring 36. As such, the retention tab 30 of the first washer 20A is configured to retain the first spring 22A in engagement with the bearing cartridge 14 by limiting axial displacement of the first spring 22A in the second axial direction.

The bearing assembly 10 of the present disclosure may provide a variety of advantages. First, the bearing cartridge 14 including the spring 22 may aid in cushioning the bearing 18 from wear and tear that can occur due to axial movement of the bearing 18 within the housing 12 of the bearing assembly 10 during operation of the bearing assembly 10. Second, the spring 22 of the bearing cartridge 14 being engaged with the washer 20 and the washer 20 being engaged with the bearing 18 results in the bearing cartridge 14 being a self-contained subassembly of the bearing assembly 10. Third, the bearing cartridge 14 being a self-contained subassembly of the bearing assembly 10 may enable convenient assembly of the bearing assembly 10 via insertion of the entire bearing cartridge 14 as a unit into the housing 12 of the bearing assembly 10.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 bearing assembly
12 housing
14 bearing cartridge
16 annular interior portion
18 bearing
20 washer
20A first washer
20B second washer
22 spring
22A first spring
22B second spring
24 inner ring
26 outer ring
28 plurality of rolling elements
30 retention tab
32 shoulder
34 channel
36 retaining ring
38 cage
40 radially inboard side
42 radially outboard side
44 side face
46 recess
48 terminal edge
50 annular interior surface
52 annular exterior surface

What is claimed is:

1. A bearing assembly, comprising:
a housing having an annular interior portion; and
a bearing cartridge disposed radially inboard of the annular interior portion and comprising:
a bearing that includes an inner ring, an outer ring, and a plurality of rolling elements disposed radially between the inner and outer rings;
a washer engaged with the bearing and having a retention tab; and
a spring that is retained in engagement with the washer via the retention tab, wherein the spring biases the washer and the bearing relative to the housing in a first axial direction, wherein the washer is engaged with the bearing, such that axial movement of the washer relative to the bearing is restricted, and wherein the spring is retained in engagement with the washer via the retention tab, such that axial displacement of the spring relative to the washer in a second axial direction that is opposite the first axial direction is limited by the retention tab.

2. The bearing assembly of claim 1, wherein the housing includes a shoulder that extends from the annular interior portion of the housing, and wherein the spring is configured to contact the shoulder and the washer to bias the washer and the bearing axially away from the shoulder.

3. The bearing assembly of claim 1, further comprising:
a retaining ring disposed within a channel defined by the housing, wherein the spring is configured to contact the retaining ring and the washer to bias the washer and the bearing axially away from the retaining ring.

4. The bearing assembly of claim 1, wherein the spring is a disc spring that includes an annular interior surface and an annular exterior surface that is positioned radially outboard of the annular interior surface.

5. The bearing assembly of claim 4, wherein the annular interior surface is positioned axially nearer than the annular exterior surface to the outer ring of the bearing.

6. The bearing assembly of claim 4, wherein the annular interior surface is positioned axially between the outer ring of the bearing and the retention tab of the washer, and at least a portion of the annular interior surface is positioned radially inboard of at least a portion of the retention tab of the washer.

7. The bearing assembly of claim 1, wherein the washer is a first washer and the spring is a first spring, and wherein the bearing cartridge further comprises:
a second washer engaged with the bearing and having a retention tab; and
a second spring that is retained in engagement with the second washer via the retention tab of the second washer, wherein the second spring biases the second washer and the bearing relative to the housing in a second axial direction that is opposite the first axial direction.

8. A bearing cartridge for insertion into a housing of a bearing assembly, comprising:
a bearing that includes an inner ring, an outer ring, and a plurality of rolling elements disposed radially between the inner and outer rings;
a washer engaged with the bearing such that axial displacement of the washer relative to the bearing is restricted; and
a spring that is engaged with the washer such that axial displacement of the spring relative to the washer is limited by the washer in a first axial direction and a second axial direction opposite the first axial direction, and axial displacement of the spring relative to the bearing is limited by the washer in the first axial direction and the second axial direction due to the engagement of the washer with the bearing restricting axial movement of the washer relative to the bearing, wherein the spring is configured to bias the washer and the bearing relative to said housing in the first axial direction.

9. The bearing cartridge of claim 8, wherein the washer comprises a retention tab that is configured to retain the spring in engagement with the washer and limit axial displacement of the spring away from the plurality of rolling elements.

10. The bearing cartridge of claim 9, wherein the washer is engaged with the outer ring of the bearing via contact between the washer and a radially outboard side of the outer ring that is opposite a radially inboard side of the outer ring with which the plurality of rolling elements contact.

11. The bearing cartridge of claim 10, wherein the spring is a disc spring that includes an annular interior surface and an annular exterior surface that is positioned radially outboard of the annular interior surface.

12. The bearing cartridge of claim 11, wherein the annular interior surface is positioned axially between the outer ring of the bearing and the retention tab of the washer, and at least a portion of the annular interior surface is positioned radially inboard of at least a portion of the retention tab of the washer.

13. The bearing cartridge of claim 8, wherein the washer is a first washer and the spring is a first spring, and wherein the bearing cartridge further comprises:
a second washer engaged with the bearing such that axial movement of the second washer relative to the bearing is restricted; and
a second spring that is engaged with the second washer such that axial displacement of the second spring relative to the bearing is limited by the second washer, wherein the second spring is configured to bias the second washer and the bearing relative to said housing in the second axial direction that is opposite the first axial direction.

14. A bearing assembly, comprising:
a housing having an annular interior portion; and
a bearing cartridge disposed radially inboard of the annular interior portion and comprising:
a bearing that includes an inner ring, an outer ring, and a plurality of rolling elements disposed radially between the inner and outer rings;
a first washer engaged with the bearing, such that axial displacement of the first washer relative to the bearing in a first axial direction and a second axial direction opposite the first axial direction is restricted;
a first spring that is engaged with the first washer such that axial displacement of the first spring relative to the bearing is limited by the first washer, wherein the first spring biases the first washer and the bearing relative to the housing in the first axial direction;
a second washer engaged with the bearing, such that axial displacement of the second washer relative to the bearing in the first axial direction and the second axial direction is restricted; and
a second spring that is engaged with the second washer such that axial displacement of the second spring relative to the bearing is limited by the second washer, wherein the second spring biases the second washer and the bearing relative to the housing in the second axial direction.

15. The bearing assembly of claim 14, wherein the bearing cartridge is operable between a first axial position within the housing, wherein the elastic potential energy of the first spring is a first amount and the elastic potential energy of the second spring is a second amount, and a second axial position within the housing, wherein the elastic potential energy of the first spring is a third amount and the elastic potential energy of the second spring is a fourth amount, and wherein the first amount is greater than the third amount and the second amount is less than the fourth amount.

16. The bearing assembly of claim 15, wherein the first amount and the second amount are substantially equal.

17. The bearing assembly of claim 14, further comprising:
a retaining ring disposed within a channel defined by the housing, wherein the first spring is configured to contact the retaining ring and the first washer to bias the first washer and the bearing axially away from the retaining ring.

18. The bearing assembly of claim 17, wherein the housing includes a shoulder that extends from the annular interior portion of the housing, and wherein the second spring is configured to contact the shoulder and the second washer to bias the second washer and the bearing axially away from the shoulder.

19. The bearing assembly of claim 14, wherein the first and second springs are disc springs.

\* \* \* \* \*